(12) United States Patent
Carpenter et al.

(10) Patent No.: US 8,776,494 B2
(45) Date of Patent: Jul. 15, 2014

(54) SYSTEM, METHOD AND APPARATUS FOR COOLING ROCKET MOTOR COMPONENTS USING A SATURATED LIQUID VAPOR COOLANT MIXTURE

(75) Inventors: Thomas W. Carpenter, San Luis Obispo, CA (US); William R. Murray, Grover Beach, CA (US); James A. Gerhardt, Atascadero, CA (US); Patrick J. E. Lemieux, San Luis Obispo, CA (US)

(73) Assignee: Cal Poly Corporation, San Luis Obispo, CA (US)

( * ) Notice: Subject to any disclaimer, the term of this patent is extended or adjusted under 35 U.S.C. 154(b) by 1027 days.

(21) Appl. No.: 12/821,100

(22) Filed: Jun. 22, 2010

(65) Prior Publication Data
US 2011/0308231 A1   Dec. 22, 2011

(51) Int. Cl.
*B63H 11/00* (2006.01)
*B64G 1/40* (2006.01)
*B64G 99/00* (2009.01)

(52) U.S. Cl.
USPC .................. 60/204; 60/257; 60/260; 60/267; 60/266; 60/200.1; 60/39.53; 60/220; 60/246; 239/127.1; 239/127.3; 239/131

(58) Field of Classification Search
USPC ............. 60/257, 260, 267, 266, 39.53, 200.1, 60/204, 220, 246; 239/127.1, 127.3, 131
See application file for complete search history.

(56) References Cited

U.S. PATENT DOCUMENTS

| 7,784,268 | B1 * | 8/2010 | Greason et al. ................. | 60/259 |
| 8,250,853 | B1 * | 8/2012 | Pinera ............................. | 60/246 |
| 2005/0188677 | A1 * | 9/2005 | Nyberg et al. ................... | 60/234 |
| 2008/0053064 | A1 * | 3/2008 | Erickson et al. ................. | 60/266 |
| 2008/0134667 | A1 * | 6/2008 | Pavia et al. ...................... | 60/267 |
| 2009/0293448 | A1 * | 12/2009 | Grote et al. ...................... | 60/204 |

\* cited by examiner

*Primary Examiner* — Craig Kim
(74) *Attorney, Agent, or Firm* — Martine Penilla Group, LLP

(57) ABSTRACT

A system and method of cooling a rocket motor component includes injecting a high pressure liquid coolant through an injector nozzle into a cooling chamber. The cooling chamber having a pressure lower than the high pressure liquid coolant. The liquid coolant flashes into a saturated liquid-vapor coolant mixture in the cooling chamber. The saturated liquid-vapor coolant mixture is at equilibrium at the lower pressure of the cooling chamber. Heat from the rocket motor component to be cooled is absorbed by the coolant. A portion of the liquid portion of the saturated liquid-vapor coolant mixture is converted into gas phase, the converted portion being less than 100% of the coolant. A portion of the coolant is released from the cooling chamber and the coolant in the cooling chamber is dynamically maintained at less than 100% gas phase of the coolant as the thrust and heat generated by the rocket motor varies.

20 Claims, 10 Drawing Sheets

SYSTEM, METHOD AND APPARATUS FOR COOLING ROCKET MOTOR COMPONENTS USING A SATURATED LIQUID VAPOR COOLANT MIXTURE

The present invention relates generally to rocket motors, and more particularly, to methods and systems for cooling rocket motors and components of rocket motors.

Liquid fuel rocket motors are traditionally cooled using the liquid fuel. The liquid fuel is circulated through a cooling chamber around portions of the rocket motor the need to be cooled such as the combustion chamber and the outlet. Liquid fuel rocket motor uses a liquid fuel and a liquid oxidizer that when combined in the combustion chamber produces thrust and of course tremendous amounts of heat.

The liquid cooling is provided to extend the service life of the rocket motors. Without liquid cooling the rocket motor would typically erode or burn away the inner surfaces of the rocket motor. Thus rendering the rocket motor as a single use rocket motor or inoperative or even resulting in a catastrophic failure such as an explosion.

Some of the more modern rocket motors are hybrid rocket motors. Hybrid rocket motors use a solid fuel and a gas or liquid oxidizer. They are termed hybrid rocket motors because the fuel and the oxidizer are in different material phases i.e. solid phase and liquid or gas phase. Hybrid rocket motors are typically simpler than a liquid fuel rocket motor while also providing much of the same operational advantages of a liquid fueled rocket motor (e.g., throttling, multiple firing and shutdown cycles, etc.).

In a hybrid rocket motor the solid fuel cannot be circulated through the cooling chamber around portions of the rocket motor because the fuel is solid phase. Using a liquid oxidizer as the rocket motor coolant has substantial limitations because the heat absorbed into the oxidizer from the rocket motor would require the oxidizer to be maintained at a very high pressure in the cooling chamber.

Further, most liquid oxidizer's are not very efficient coolants. Further still, a heated oxidizer can be very difficult to manage safely. As a result rocket the motor would be more likely to have a catastrophic failure. Thus reducing the overall reliability of the hybrid rocket motor which is the precisely opposite goal of the hybrid rocket motor.

However there is still a need for cooling hybrid rocket motors to extend the life of the hybrid rocket motor so that they can be used multiple cycles and multiple flights.

SUMMARY

Broadly speaking, the present invention fills these needs by providing a system, method and apparatus for cooling hybrid rocket motors. It should be appreciated that the present invention can be implemented in numerous ways, including as a process, an apparatus, a system, computer readable media, or a device. Several inventive embodiments of the present invention are described below.

A system and method of cooling a rocket motor component includes injecting a high pressure liquid coolant through an injector nozzle into a cooling chamber. The cooling chamber having a pressure lower than the high pressure liquid coolant. The liquid coolant flashes into a saturated liquid-vapor coolant mixture in the cooling chamber. The saturated liquid-vapor coolant mixture is at equilibrium at the lower pressure of the cooling chamber. Heat from the rocket motor component to be cooled is absorbed by the coolant. A portion of the liquid portion of the saturated liquid-vapor coolant mixture is converted into gas phase, the converted portion being less than 100% of the coolant. A portion of the coolant is released from the cooling chamber and the coolant in the cooling chamber is dynamically maintained at less than 100% gas phase of the coolant as the thrust and heat generated by the rocket motor varies.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION

Several exemplary embodiments for a system, method and apparatus for cooling rocket motors will now be described. It will be apparent to those skilled in the art that the present invention may be practiced without some or all of the specific details set forth herein.

One approach to cooling rocket motors and components thereof is to use the phase change of a liquid coolant to cool the rocket motor. One or both of the fuel and the oxidizer could be used as the coolant in a liquid fueled rocket motor. If both the oxidizer and the fuel are used to cool the rocket motor, each of the oxidizer and the fuel are contained in separate cooling chambers that are thermally coupled to the portions of the rocket motor to be cooled. In a hybrid rocket motor a liquid oxidizer could be used as the coolant.

The phase change from liquid to gas requires a quantity of energy known as the heat of vaporization. The heat of vaporization is different for each coolant material. As the coolant absorbs the energy to meet the heat of vaporization and change the state of the coolant from liquid phase to gas phase, the temperature of the coolant does not increase. Thus, the coolant can be maintained at a nearly constant temperature while absorbing energy in the form of heat from the rocket motor. The heat of vaporization is the amount of heat required to convert a given mass of a material in its liquid phase into the gas phase at constant temperature and pressure. The gas phase material will release the same amount of heat when it condenses to become liquid phase.

In one approach, the coolant can be injected into the cooling chamber in a saturated liquid-vapor form. A saturated liquid-vapor form is when the liquid phase coolant and gas phase coolant are in equilibrium for the present temperature and pressure. The heat from the rocket motor converts the liquid phase portion of the saturated liquid-vapor coolant to the gas phase of the coolant. In this way the temperature of the coolant in the cooling chamber does not substantially change. Instead the heat energy absorbed from the rocket motor is used to change the phase of the coolant from liquid phase to gas phase.

The amount of the heat the saturated liquid-vapor coolant mixture can absorb from the rocket motor is a function of a residence time of the coolant in the cooling chamber, a volume of the coolant in the cooling chamber and the heat of vaporization of the coolant. The gas phase coolant that is output from the cooling chamber can be vented off or used in the combustion process.

By way of example, a liquid phase of the coolant at a first pressure is injected into the cooling chamber through an injector. The pressure of the cooling chamber is a second pressure lower than the first pressure. Therefore, the liquid coolant will drop to the second pressure and flash to form a saturated liquid-vapor coolant mixture at an equilibrium point for that temperature and pressure. The heat from the rocket motor is absorbed by the liquid phase portion of the saturated liquid-vapor coolant mixture in the cooling chamber. This heat satisfies the heat of vaporization of at least a portion of the liquid phase portion of the saturated liquid-vapor coolant mixture to convert to a gas phase. The gas phase coolant is output from the cooling chamber before the coolant in the cooling chamber is 100% gas.

Any coolant having a suitable heat of vaporization could be used to cool the rocket motor. One example of a suitable coolant is nitrous oxide ($N_2O$) which is also used as an oxidizer. It should be understood that other oxidizers and fuels could also be used as rocket motor coolants.

Using an oxidizer as the cooling media in the hybrid rocket motor provides several benefits. First, the oxidizer is already onboard the rocket for oxidizing the fuel and using the oxidizer cooling eliminates a requirement of carrying a third material for coolant purposes. Second, the oxidizer used as the coolant can then be consumed in the combustion to oxidize the fuel.

In a more specific example of the rocket motor cooling process, a saturated liquid-vapor coolant mixture is injected into the cooling chamber.

At 100% gas phase of the coolant, the coolant cannot absorb any more heat from the rocket motor without increasing in at least one of temperature or pressure. Further, the gas phase of the coolant is not nearly as efficient absorbing rocket motor heat as the liquid phase of the coolant.

In one embodiment the temperature and pressure of the cooling chamber can be monitored and the coolant can be output or flow through the cooling chamber increased if there is a significant pressure and/or temperature increase in the cooling chamber as that would indicate the coolant in the cooling chamber has reached or is approaching a condition of 100% gas phase of the coolant.

A rapid rate of increase in pressure or temperature is another mechanism for indicating the coolant is approaching a condition of 100% gas phase of the coolant. The rapid rate of increase in temperature or pressure would be greater than of a rate of increase in temperature of the rocket motor component being cooled by the cooling chamber. By way of example; the rocket motor component being cooled might experience a low rate of increase in temperature of 10 degrees over a 10 second period if the temperature of the coolant in the cooling chamber increased more than 10 degrees in 10 seconds, then the coolant could be approaching 100% gas phase. As a result, a coolant flowrate could be increased.

If additional heat were added to the 100% gas phase of the coolant, the coolant can begin to dissociate and break down into its constituent elements. By way of example, a nitrous oxide coolant would break down into elemental nitrogen and oxygen. Dissociating nitrous oxide is an exothermic reaction and therefore releases additional heat. This additional heat can cause a cascade of dissociation and exothermic reaction resulting in a potentially catastrophic overheating of the rocket motor as well as a rapid increase in pressure in the cooling chamber and a potential catastrophic mechanical failure of the cooling chamber and the rocket motor due to over-pressurization.

Therefore, the residence time of the saturated liquid-vapor coolant mixture in the cooling chamber is limited so that the coolant in the cooling chamber does not achieve 100% gas phase of the saturated liquid-vapor coolant mixture. As stated above, the coolant output from the cooling chamber can be injected into the combustion chamber for combustion with the fuel and/or vented.

One use of the cooling system and method described here in is in cooling rocket motor components. One of the difficulties with hot-fired aerospike rocket motor nozzles, is the high heat loads at the base of the spike, which can cause ablation of the spike and a degradation of performance, and eventually even cause failure of the entire nozzle and rocket motor. The purpose of a rocket motor nozzle is to accelerate a propellant, from a reservoir at high stagnation pressure, for the purpose of creating thrust. The effectiveness with which the rocket motor produces thrust is generally characterized by the nozzle thrust coefficient. The nozzle thrust coefficient is thrust normalized by the product of throat area and nozzle stagnation pressure.

Definitions of symbols used herein:
$A_e$=Nozzle exit plane area
$A^*$=Nozzle throat area
$C_F$=Thrust Coefficient
$D_t$=Throat diameter
h=Local heat transfer coefficient
$I_{sp}$=Specific impulse
$P_e$=Exit plane pressure $P_0$=Nozzle stagnation pressure
$P_\infty$=Ambient pressure
R=Axial radius of curvature of nozzle
$T_{cu}$=Measured copper throat temperature (cold side)
z=Axial distance along nozzle
γ=Ratio of specific heats Equation (1) expresses the thrust coefficient as a function of the rocket motor operating parameters and of the ambient pressure into which the nozzle discharges.

$$C_F = \sqrt{\frac{2\gamma^2}{\gamma-1}\left(\frac{2}{\gamma+1}\right)^{(\gamma+1)/(\gamma-1)}\left[1-\left(\frac{P_e}{P_0}\right)^{(\gamma-1)/\gamma}\right]} + \left(\frac{P_e-P_\infty}{P_0}\right)\frac{A_e}{A^*} \quad \text{Equation 1}$$

The nozzle performance, as characterized by the thrust coefficient, is maximized when the nozzle operates at fully expanded conditions, i.e., when the nozzle exit plane pressure equals the ambient pressure, a condition that defines the nozzle's design pressure ratio $P_0/P_\infty$. For a conventional converging-diverging nozzle, with fixed area ratio, this means that performance can only be optimum at a single operating ambient pressure. For the continuously-changing ambient pressure (and thus nozzle pressure ratio) of a typical rocket atmospheric trajectory, the thrust coefficient is therefore non-optimum for much of its operation.

Figure 1A:
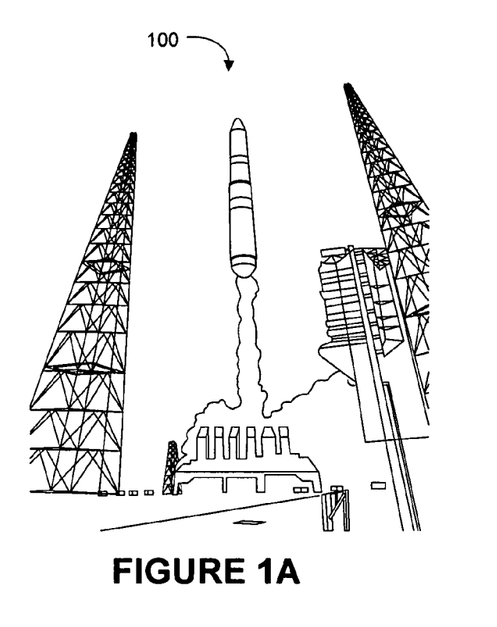
FIG. 1A illustrates a typical rocket motor plume at sea level.
Figure 1B:
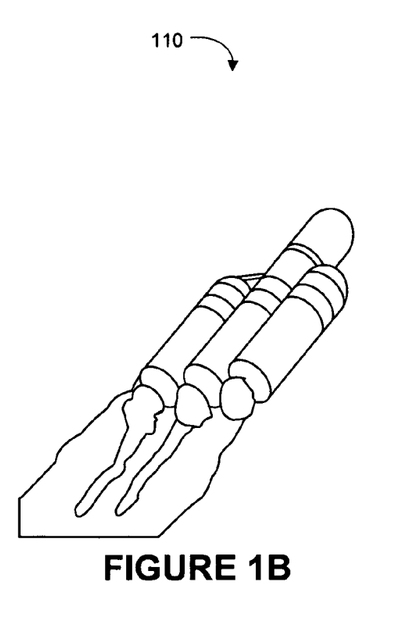
FIG. 1B illustrates a typical rocket motor plume at optimal altitude.

The effect of this change in nozzle performance as a function of altitude can be seen in FIGS. 1A and 1B. FIG. 1A illustrates a typical rocket motor plume 100 at sea level. FIG. 1B illustrates a typical rocket motor plume 110 at optimal altitude. The overexpanded flow condition 100 of the nozzle is clearly evident in the shape of the plume at sea level. In contrast, the shape of the plume 110 at operation at high altitude is closer to its optimal design pressure ratio.

Figure 2:
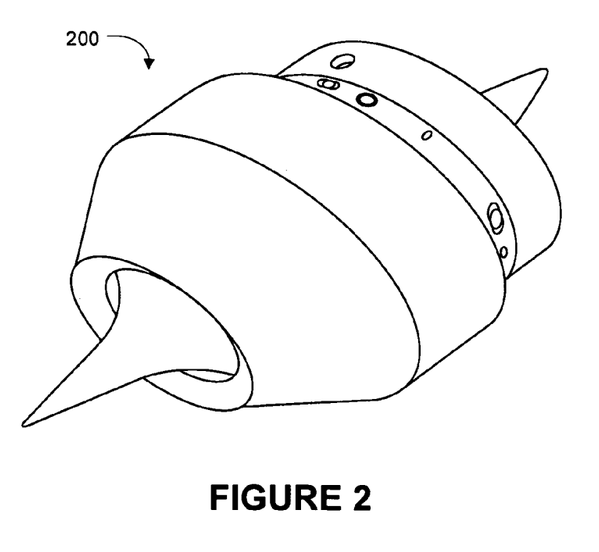
FIG. 2 is an aerospike nozzle, in accordance with an embodiment of the present invention.

FIG. 2 is an aerospike nozzle 200, in accordance with an embodiment of the present invention. The aerospike nozzle, by contrast, consists of a shaped longitudinal spike protruding past the body of the rocket motor, creating an annular throat at the plane where it protrudes, and directing the flow radially inwards along the spike. The propellant gases then expand outside the rocket engine, along the spike. The spike may be thought of as consisting of an infinite series of ramps for the flow to realign itself longitudinally. There are no physical outside boundaries to the nozzle, so the plume is immediately at atmospheric pressure. The contour is effectively that of a conventional converging-diverging nozzle turned 'inside-out', and much of the same design methods apply.

During normal operation, the aerospike nozzle 200 works by combining two effects: the axial thrust of the propellant gases at the throat, and the axial reaction force along the spike.

The unique feature of this design is that at low altitude (lower nozzle pressure ratios), the flow recompresses along the spike in a series of oblique shocks, building pressure continuously on the spike.

As the pressure ratio increases (as the rocket gains altitude), the recompression points move axially outward along the spike, causing a natural change in pressure distribution and effectively creating continuous altitude correction of the nozzle. The overall effect is a relatively uniform, longitudinal flow that is parallel to the axis of the engine at all points of flight, approximating an ideally expanded converging-diverging nozzle at all nozzle pressure ratios.

In terms of performance, equation (1) for the thrust coefficient still applies, except that the exit plane pressure, $P_e$, now equals the ambient pressure $P_\infty$, at all points of flight, and the second term vanishes at every point. The practical benefit of this may best be appreciated by considering an example loosely based on the Delta IV RS-68 rocket motor shown in FIGS. 1 and 1B. The Delta IV RS-68 rocket motor has a converging-diverging nozzle with an area ratio of 27 and a chamber pressure of 11 MPa, designed for fully expanded operation at 10,000 m. The same rocket motor would see an increase in thrust coefficient of more than 5% at sea level if it were fitted with an aerospike nozzle.

The effect of an aerospike nozzle is particularly attractive for single-stage-to-orbit missions, where a single nozzle must operate efficiently over a wide range of conditions (e.g., pressure ratios). Even a truncated aerospike, a configuration referred to as plug nozzle, provides some performance advantages. Performance is partly recovered if a gas is injected at the base of the plug ('base bleed').

Figure 3:
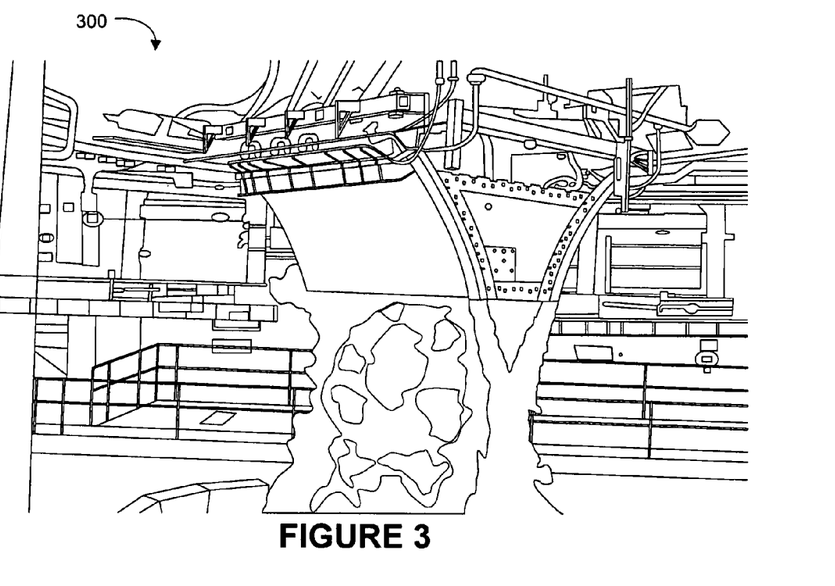
FIG. 3 illustrates an X-33 truncated linear aerospike nozzle 300.

FIG. 3 illustrates an X-33 truncated linear aerospike nozzle 300. The X-33 truncated linear aerospike nozzle 300 is shown during a hot-fire test. The X-33 truncated linear aerospike nozzle 300 is perhaps the best known documented development program of such a truncate aerospike nozzle.

There is little evidence of test flight data of aerospike motors of any type in the literature. One of the few describes a series of tests on solid rockets, benchmarked against a conventional nozzle. In this test program, two aerospike rocket motors and one conventional rocket motor were flown successfully to supersonic speeds, providing the first recorded flights of solid-propellant aerospike rockets as well as the first set of transonic flight performance data for these types of rocket motors.

There have been no test flights and no published studies of aerospike nozzles on hybrid rocket motors. The lack of a comprehensive flight test database has precluded the use of these types of nozzles in current as well as next-generation space vehicles.

Some of the significant drawbacks of aerospikes include the design of a support structure isolated from the heat of the combustion chamber. There is also a fundamental problem of creating the spike structure itself so that the spike can survive and function fully while immersed in the hottest part of the exhaust flow from the rocket motor.

Hybrid rocket motors define a class of rocket propulsion systems where the fuel and the oxidizer are introduced in different phases. Most often, fuels are made of a solid 'grain', and the oxidizer is introduced as a liquid. Common hybrid rocket motor fuels are HTPB and Plexiglas® and a common oxidizer is nitrous oxide ($N_2O$). HTPB is hydroxyl-terminated polybutadiene, a synthetic rubber that is used as a binder in solid rocket motors and as a fuel in hybrid rocket motors.

Advantages of a hybrid rocket motor include the convenience of being able to store the fuel and oxidizer in relative safety without special precautions. The fuel and the oxidizer do not burn when brought together without a significant source of heat for ignition. Because of its high vapor pressure, $N_2O$ can be self-pumping, thereby reducing the need for expensive designs requiring turbo-pumps. The hybrid rocket motor also offers the potential for in-flight throttling, shutdown, and re-ignition.

The potential for hybrid rocket motors was clearly demonstrated in 2004, when SpaceShipOne won the Ansari X-Prize using an air-launched space vehicle powered by an $N_2O$-HTPB hybrid rocket motor. On Jul. 26, 2007, a fatal accident during a cold-flow test of a hybrid rocket liquid oxidizer at the same company cast doubts over the safety of hybrid motors, their future development, and highlighted the continuing lack of engineering experience with these types of systems. Hybrid rocket motors equipped with advanced nozzles with thrust vectoring and throttling capabilities could play a role in programs trying to achieve lower cost access to low earth orbit as well as providing alternative propulsion means for tactical missiles.

As a result of the operating environment in which they operate, rocket motors are susceptible to the effect of high heat loads and ablation. Aerospike nozzles are particularly vulnerable to this problem, since much of the nozzle is completely surrounded by the hot gas flue. Thus, three options are available to the nozzle developer:

1. Selection of exotic materials, capable of withstanding the highest heat loads expected.
2. Reduction of the maximum heat loads, by limiting chamber pressure or operating the motor at sub-optimal oxidizer to fuel ratio.
3. Active cooling of the parts most severely exposed to the hot gases.

Tests have shown that even by lining the nozzle with relatively resistant materials such as graphite, ablation is a difficult and very expensive problem to mitigate by material selection alone.

Figure 4:
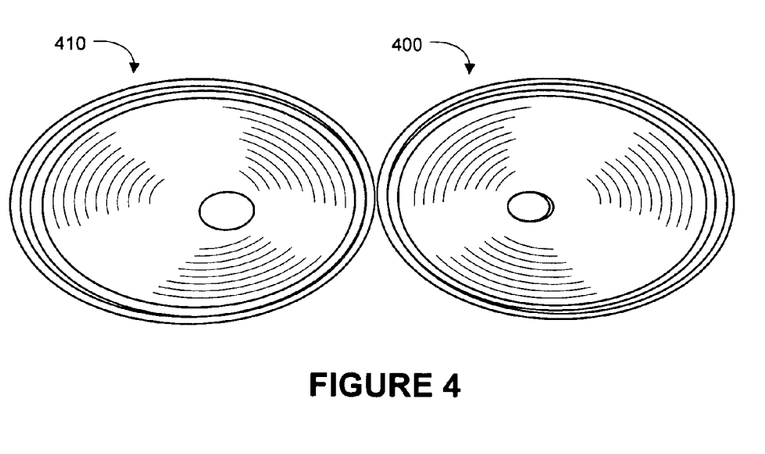
FIG. 4 illustrates a nozzle throat, in accordance with an embodiment of the present invention.

FIG. 4 illustrates a nozzle throat 400, in accordance with an embodiment of the present invention. The nozzle 400 is new and has not yet been fired. The nozzle 410 has been fired for approximately 20 seconds. The severe ablation is evident, as shown by the increased area of the throat on the nozzle 410. The thrust performance of the nozzle 400 degraded continuously throughout the test rendering the nozzle un-reusable.

As shown the effective diameter/area of the nozzle throat 400 was ablated to about twice the diameter/area. This translates to continuously degrading thrust performance in the course of a test run. To operate rocket motors in off-design modes for the sake of preserving the nozzle does not represent a viable long term solution either. Therefore, active cooling of the hottest rocket motor components (e.g., aerospike, nozzle, combustion chamber throat) seems to offer the best promise, and has been used for a long time in rocket motor and gas turbine designs.

Active cooling is a recognized method of maximizing the life and durability of rocket motor components. Recent published work illustrates how traditional cooling strategies (e.g., liquid fuel cooling) are still applicable to the modern needs of rocket motor designs. These studies, however, traditionally focus on using the fuel to cool rocket motor components.

The direct use of oxidizers for the cooling of rocket motor components raises a concern of increased reactivity at the wall. While this potentially increases the engineering complexity of the system development process, it does not impose a fundamental barrier to the use of oxidizers for cooling rocket motor components.

There are several reasons why $N_2O$ represents an attractive coolant for component cooling. Unlike most liquid rocket fuels used for active cooling, $N_2O$ as used in this application is sub-critical, meaning that nucleate boiling and the latent heat of vaporization are available to increase heat transfer rates. Because the $N_2O$ is in a saturated state during the cooling process, its bulk temperature is relatively constant, so that forced convection with the hot walls is enhanced. Finally, because of the saturated equilibrium state of the $N_2O$, its pressure can remain relatively constant during the cooling process so that the system is effectively self-pumping, simplifying the system.

$N_2O$ dissociates exothermically so that using $N_2O$ as a coolant creates a risk of runaway reaction that may quickly degenerate into the catastrophic failure of the nozzle. While a true regenerative cooling setup is conceivable, especially in view of the self pumping nature of this coolant, the positive heat of formation of $N_2O$ (approximately 1.85 kJ/kg), makes it difficult from a safety point of view. The heated coolant was released outside of the combustion chamber after cooling the rocket motor throat. In this case, therefore, using this oxidizer reduces the specific impulse of the entire rocket motor in proportion to the mass flow rate used for cooling.

Basic Contoured Nozzle Design

Ablation at the throat is a direct consequence of high localized heat transfer rates and surface temperature. Thus, ablation may be partly mitigated by reducing the coefficient of heat transfer between the hot gases and the nozzle walls. According to Bartz, the heat transfer coefficient h at the throat is inversely proportional to the radius of curvature at the throat raised to a power, as shown in Equation 2:

$$h \propto \frac{1}{R^{0.1}} \qquad \text{Equation 2}$$

The radius R of curvature at the throat clearly cannot be increased arbitrarily without affecting the overall flow through the nozzle and, eventually, the performance of the rocket motor itself. One approach in rocket nozzle design is to maintain the circular arc radius of curvature at the throat between 0.5 and 1.5 times the throat radius. Thus, a nozzle consisting of a throat with a large circular arc curvature designed in such a way that it blends the converging conical design upstream to the diverging conical design downstream, matching the nozzle sections used in uncooled tests provides a good starting platform for an actively cooled nozzle designed to be used multiple times. Adapted with a cooling annulus ring cooling chamber around the narrowest part of the rocket motor throat, the resulting nozzle provided the foundation for the cooling analysis and tests performed and described herein as an exemplary embodiment.

Figure 5:
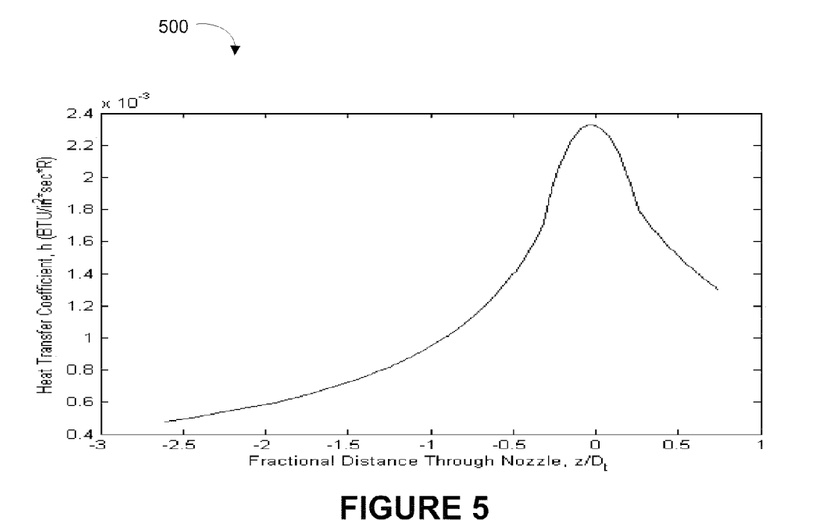
FIG. 5 is a graph of the heat transfer coefficient on the hot side of the nozzle, in accordance with an embodiment of the present invention.

The heat transfer level on the hot-side depends on the nozzle geometry (e.g., curvature) and stagnation and freestream conditions. The latter were calculated using a thermo-chemical equilibrium calculation of the hot rocket motor exhaust gases and their temperature at the throat, using a well-established calculation method. One goal of the analysis was to mitigate wall heating so that maximum wall temperature ranges from 500° F. to 1000° F. FIG. 5 is a graph 500 of the heat transfer coefficient on the hot side of the nozzle, in accordance with an embodiment of the present invention. The heat transfer coefficient on the hot side of the nozzle is specified by the geometry of the nozzle and the hot flow conditions. The maximum heat flux obtained at the throat is then a function of wall temperature only. Finally, wall temperature is ultimately determined by the coolant side heat transfer coefficient. There is no closed form expression at this time for the coolant side heat transfer coefficient. As a result, the solution to the heat transfer problem that determines the maximum throat wall temperature is be carried out iteratively.

The optimum $N_2O$ cooling strategy within a range of heat flux established for the hot side depending on the test flow conditions, the flow conditions on the cold side may be investigated, and targeted to provide the lowest wall temperature possible. The mechanism by which $N_2O$ is used to reduce the wall temperature is twofold. First, high pressure saturated liquid $N_2O$, typically between about 700 psig and 800 psig (at ambient temperature of about 20-25 degrees C.), normally used for combustion supply, is re-routed to a annular cooling chamber surrounding the rocket motor throat at its highest temperature location. There, the liquid $N_2O$ injected through a n injector nozzle into the annular cooling chamber, at a lower pressure (e.g., 350-400 psig) but constant enthalpy. The resultant coolant is thus a two-phase saturated liquid-vapor coolant mixture and significantly cooler (e.g., about −8 degrees C.) than upstream of the injectors, creating favorable convection conditions for the wall heated by the rocket motor component to be cooled.

Second, the two-phase saturated liquid-vapor coolant mixture continues to evaporate as it flows, at a rate determined by its mass flow rate, latent heat of vaporization and overall heat flux, itself a function of the cold side heat transfer coefficient, surface temperature and area. Nominally, the pressure and temperature of the saturated two-phase liquid-vapor coolant mixture remains constant while this takes place. The continuous heating also causes a drop in pressure, which further tends to reduce saturation temperature. Ideally, from the standpoint of minimizing 4 penalty, the coolant exits the annular cooling chamber upon reaching its superheated state at that pressure condition.

Figure 6:
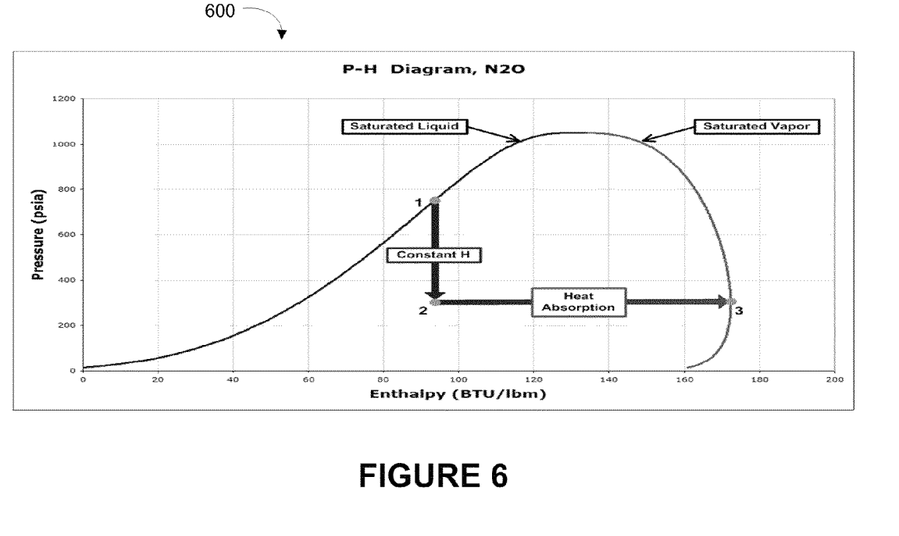
FIG. 6 is a graphical representation of an idealized process path of coolant, in accordance with an embodiment of the present invention.

FIG. 6 is a graphical representation 600 of an idealized process path of coolant, in accordance with an embodiment of the present invention. The P-h diagram 600 of $N_2O$, with idealized process path of coolant, from supply bottle (point 1) to annular cooling chamber outlet (point 3). In practice, heat absorbed between the supply bottle and the annular cooling chamber injector would shift point 2 to the right, and the pressure may be expected to drop between points 2 and 3.

Based on the shape of the pressure-enthalpy (P-h) diagram for $N_2O$ 600, a suitable target setpoint for the state of the coolant in the annular cooling chamber is 300 psia. With the incoming state of the $N_2O$ is a saturated liquid at 750 psia (corresponding to a bottle temperature of about 20 degrees C.), the maximum enthalpy of vaporization available for cooling is approximately 79 $BTU/lb_m$. This specific heat of vaporization, times the mass flow rate of $N_2O$ in the cooling passage, is the rate at which heat can be absorbed by the coolant in this scheme.

Implicit in this analysis is that the heat transfer coefficient on the cold side is sufficiently high to maintain the surface temperature at the desired level (at most 1000° F.). Since the difference between wall and flow temperatures on the cold side is expected to be approximately 5 times lower than that on the hot side, the average heat transfer coefficient must therefore be 5 times greater than the hot side, assuming that the surface areas exposed to the flows are substantially equal on both sides.

If the surface temperature is to be lower, then the ratio of heat transfer coefficients must be correspondingly larger. Similarly, if the surface areas exposed to both flows are not identical, then the required heat transfer coefficients ratio changes accordingly.

Furthermore, by energy balance, the higher the flow of coolant in the annular cooling chamber, the closer point 3 (state of coolant at cooling chamber outlet) remains to point 2 in FIG. 6. With estimates of heat transfer coefficients on the hot side and cold side of the throat along with a target throat surface temperature, a design for the geometry of the cooling passage suitable for the experiment described here is possible.

Heat transfer coefficient calculations for 2-phase, turbulent film boiling, however, are notoriously difficult to perform accurately, and it is generally accepted that the evaluation of this coefficient requires experimental data for most fluids and geometry. Qualitatively, the heat transfer coefficient tends to be highest when the quality of a two-phase flow is in the saturated flow boiling, annular liquid film and vapor core region, which is not likely to take place close to the saturated vapor curve, meaning that for a conservative approach, the mass flow rate of coolant needs to be high enough for the quality of the $N_2O$ exiting the cooling passage to remain relatively low.

Figure 7:
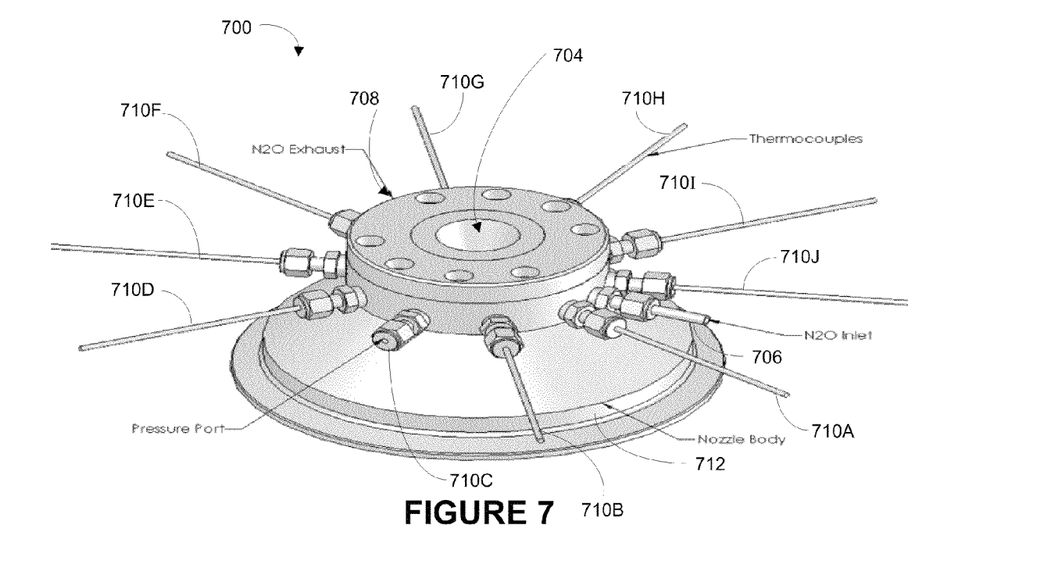
FIG. 7 is a schematic representation of a cooling system, in accordance with an embodiment of the present invention.
Figure 8:
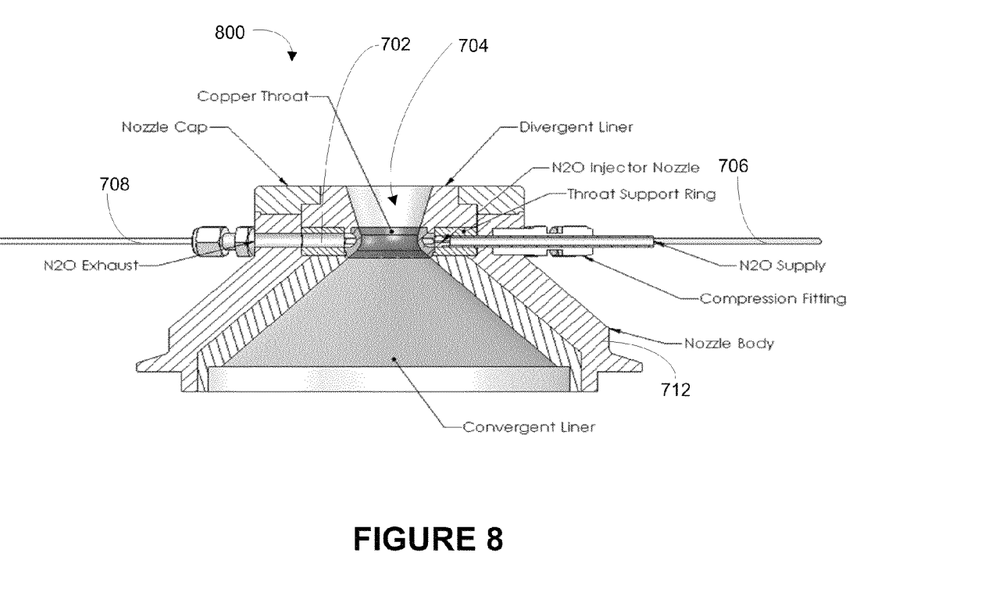
FIG. 8 is a cross-sectional view of the cooling system, in accordance with an embodiment of the present invention.
Figure 9:
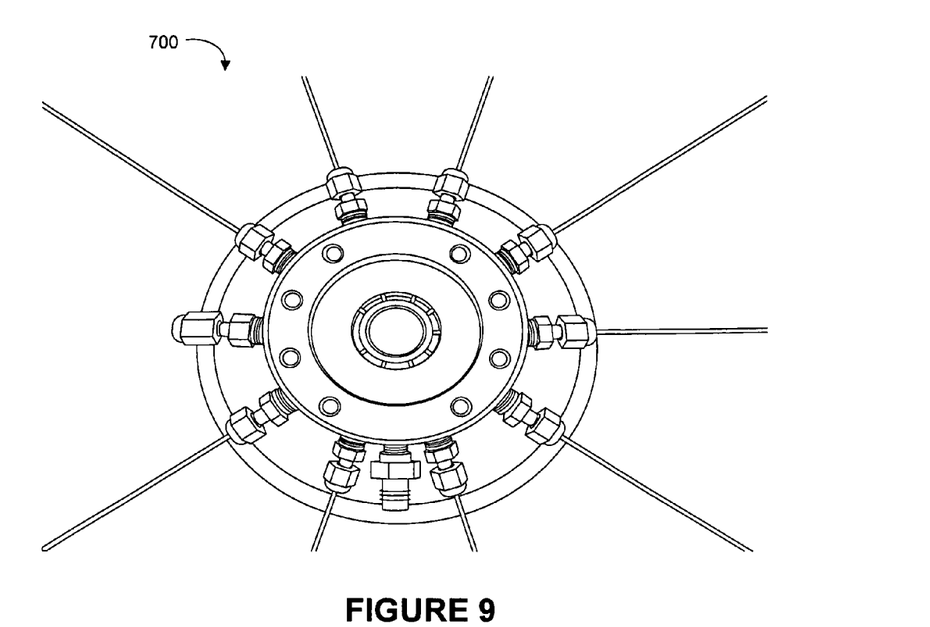
FIG. 9 is a top view of the cooling system, in accordance with an embodiment of the present invention.
Figure 10:
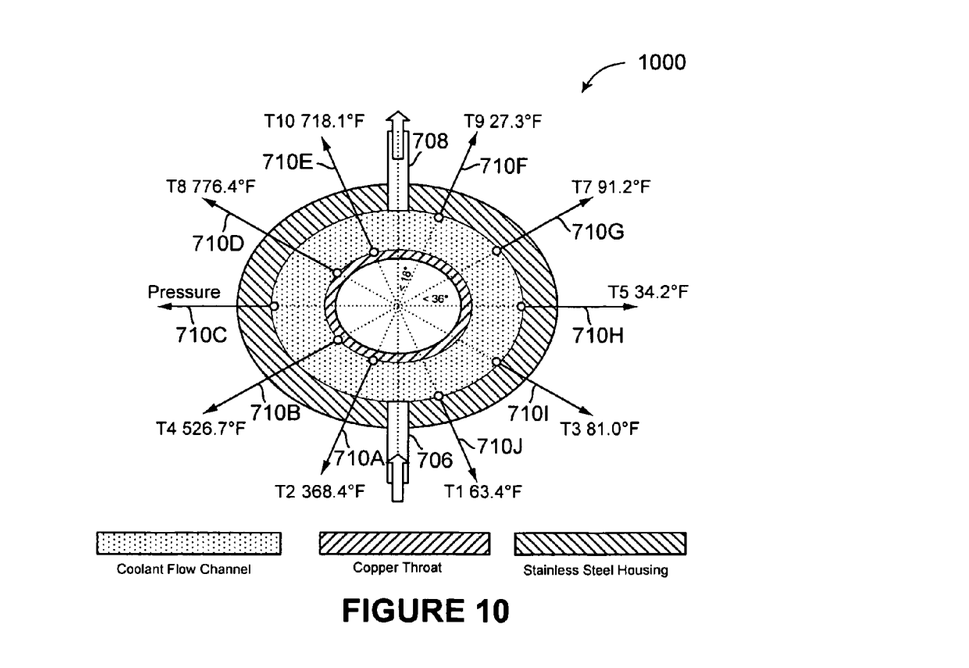
FIG. 10 is a schematic view of the cooling system dynamic data, in accordance with an embodiment of the present invention.

FIG. 7 is a schematic representation of a cooling system 700, in accordance with an embodiment of the present invention. FIG. 8 is a cross-sectional view 800 of the cooling system 700, in accordance with an embodiment of the present invention. FIG. 9 is a top view of the cooling system 700, in accordance with an embodiment of the present invention. FIG. 10 is a schematic view of the cooling system dynamic data 1000, in accordance with an embodiment of the present invention. One exemplary cooling system 700 includes an annular coolant chamber 702 around the rocket motor throat 704, with a single coolant inlet 706 and a single coolant outlet 708. The coolant inlet 706 and the single coolant outlet 708 are shown 180° apart around the circumference of the annular coolant chamber 702.

The cooling system also includes multiple sensors 710A-J for monitoring the coolant temperature and pressure, as well as throat temperature, as a function of distance traveled along the cooling passages, with no chance of multiple streams mixing. The sensors 710A-J can include one or more thermocouples and pressure transducers. Referring again to FIG. 8, a nozzle body 712 and rocket motor throat 704 is shown. The downstream conical diverging section is not shown.

Figure 11:
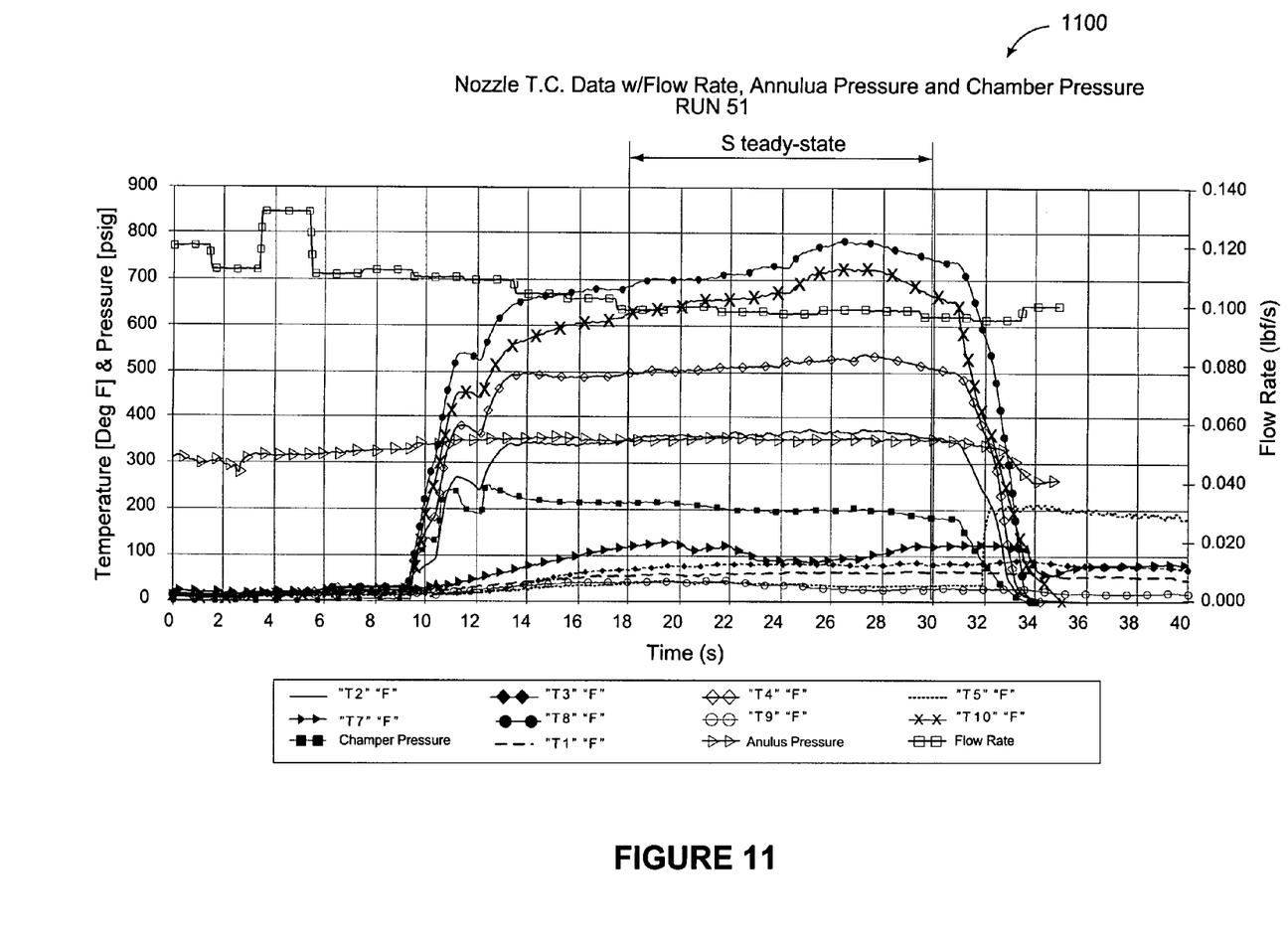
FIG. 11 is a graphical representation of the data test from run 51, in accordance with an embodiment of the present invention.

Referring to FIG. 10 the lay-out of sensors around the cooling chamber 702 is shown. Thermocouples T1 710J, T3 710I, T5 710H, T7 710G and T9 710F measure the bulk coolant temperature. Thermocouples T2 710A, T4 710B, T8 710D, and T10 710E measure the throat temperature at its thinnest point. The temperature values shown correspond to a single time point during Run 51. FIG. 11 is a graphical representation 1100 of the data test from run 51, in accordance with an embodiment of the present invention.

Through multiple test runs, the data for cold side gas temperature, pressure, mass flow rate and surface temperature is continuously recorded. This data, however, does not lend itself directly to a single, overall heat transfer coefficient calculation. First, the transient nature of each of the test runs carried out does not provide good estimates of steady-state value of heat transfer coefficient, required in a design focused on a maximum temperature.

Second, the material bounding the copper throat participates to some extent in conducting heat to and from the throat, making the actual path of heat transfer three dimensional and difficult to characterize analytically. The temperature profile of the copper throat itself, found to vary significantly along the contour of the annular cooling chamber, is not easily reduced to a single value representing an 'average convective surface temperature.'

Third, as discussed above, the local heat transfer coefficient changes value continuously along the cooling path (as the quality of $N_2O$ increases), and these variations must be taken into account in the overall heat transfer coefficient.

Given these limitations, a finite element analysis (FEA) model is ultimately a more appropriate tool to provide detailed design guidelines for such a problem. But the analytical process is nevertheless necessary to provide a starting point for finding appropriate boundary conditions to the model, and to troubleshoot its results.

Referring to FIG. 11, the thermocouple run data appears as a series of transient events, however there exists a clear period of steady state operation during each test from the standpoints of coolant pressure, coolant mass flow rate, and rocket motor chamber pressure (thus rocket motor operation). Example of 'steady-state', as defined for the purpose of heat transfer coefficient calculations as used for the purpose. The period chosen for each run data always exceeded 10 seconds, consisting of a time period within which the coolant pressure, flow rate, and rocket operation are relatively constant. The heat transfer at the throat during that time is expected to also be relatively constant, and the overall heat transfer coefficient is based on temperature measurements made during that window of time only. The heat transfer process consists of convection from the hot gases to the throat, conduction through the material of the throat, and convection to the coolant.

Figure 12:
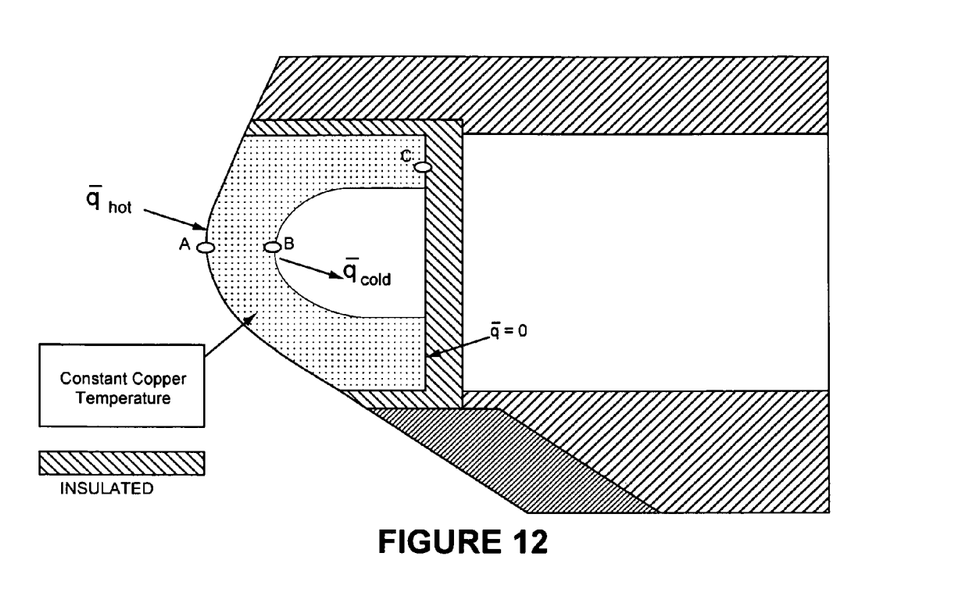
FIG. 12 is a cross-sectional schematic view of the carbon sleeve and corrosion resistant steel (CRES) backing of the nozzle body surrounding the throat, in accordance with an embodiment of the present invention.

FIG. 12 is a cross-sectional schematic view 1200 of the carbon sleeve and corrosion resistant steel (CRES) backing of the nozzle body surrounding the throat, in accordance with an embodiment of the present invention. FIG. 12 illustrates a low Biot number assumption for heat transfer coefficient calculation. The throat material and cooling chamber 702 conduct heat much more slowly that the throat material, to both hot and cold sides. For the purposes of analysis, these boundaries are assumed to be thermally insulated from the cooling chamber 702 and throat 704, i.e., adiabatic boundaries conditions in each test run.

Since the heat transfer coefficient is unknown on the cold side, it is unclear how the temperature varies throughout the throat material. It is measured at one point, along the throat plane, in the thinnest part of the throat material close to the hot flow. The temperature distribution everywhere else on the throat material may be expected to fall between two extremes.

The convective heat transfer (both hot and cold side) is slower than conductive heat transfer through the throat body. Temperature is constant throughout at $T_{cu}$, low Biot number as shown in FIG. 12.

Figure 13:
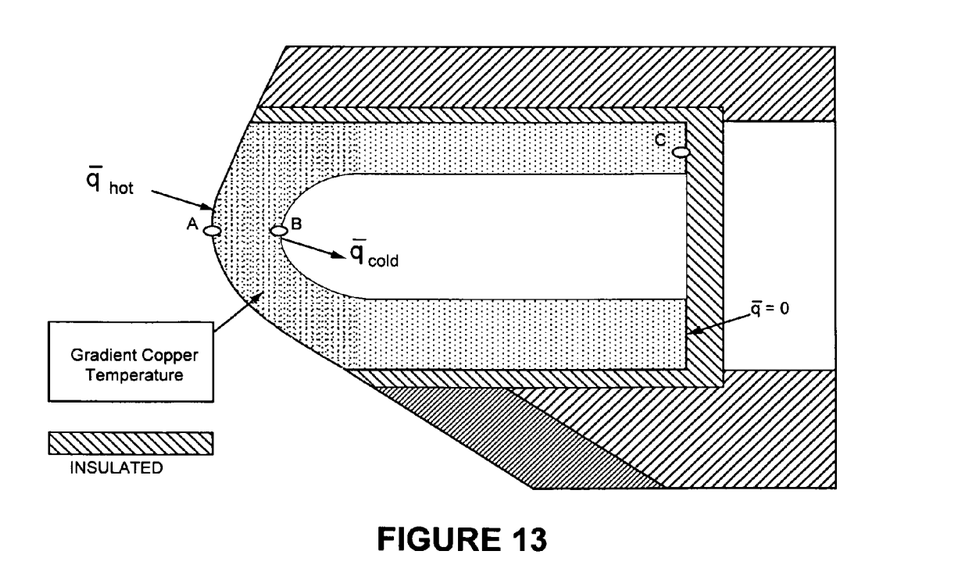
FIG. 13 shows a schematic representation of a high Biot number (cold side) for heat transfer coefficient calculation, in accordance with an embodiment of the present invention.

FIG. 13 shows a schematic representation 1300 of a high Biot number (cold side) for heat transfer coefficient calculation, in accordance with an embodiment of the present invention. The convective heat transfer (both hot and cold side) is faster than conductive heat transfer through the throat body. Throat material temperature is uniformly varying, with a gradient between measured $T_{cu}$, close to the hot gases at the throat, going down to cool gas temperature at the throat material farthest away from the hot gases to show a high Biot number assumption, cold side. The size/thickness of the throat material insert is exaggerated for illustration purposes.

The average, overall heat transfer coefficient may then be directly computed. The heat transfer coefficient used to characterize each run is the average of the two coefficients obtained from the two assumptions made above.

Figure 14:
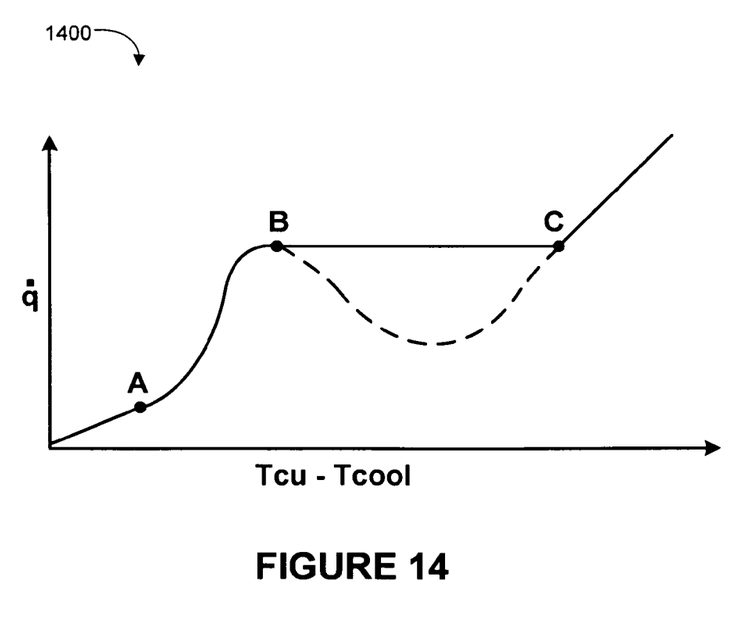
FIG. 14 is a graphical representation of a heat flux curve for two-phase coolant flows, in accordance with an embodiment of the present invention.

For two-phase saturated liquid-vapor coolant flows, the heat transfer rate does not vary linearly with temperature difference with the wall heated by the rocket motor component, as it does in the case of a gas. FIG. 14 is a graphical representation 1400 of a heat flux curve for two-phase coolant flows, in accordance with an embodiment of the present invention. Heat flux rate as a function of temperature difference between the hot copper surface and coolant temperature for a two-phase coolant. By contrast, a single phase (or supercritical) coolant heat transfer curve would continues rising more or less linearly towards Point C, so that two-phase heat-transfer coefficients are always higher. While a quantified form of this curve 1400 specific to $N_2O$ is not available, the cooling system described herein suggest operation between Points A and B, thus providing the necessary ratio of heat transfer coefficients. Operation at heat fluxes higher than Point B is expected to cause the rapid failure of the throat, and needs to be avoided at all times.

The cold side heat transfer coefficient was computed for the 7 test runs results, presented in Table 1.

TABLE 1

COOLING RUNS DATA SUMMARY

| Run # | Steady-State Time [sec] | Coolant Mass Flow Rate [lbm/sec] | Coolant Pressure [PSIG] | Average Coolant Temperature [F.] | Average Copper Temperature [F.] | Approx. Hot Side Temperature [F.] | Hot Side Average h BTU (in2*sec*R) | Cold Side Average h BTU (in2*sec*R) | Ratio h_cold/h_hot |
|---|---|---|---|---|---|---|---|---|---|
| 48 | NA | NA | 700 | 70 | NA | 2982 | 2.45E−03 | 5.57E−03 | 2.27 |
| 49 | 10 | 0.059 | 444 | 47 | 435 | 2982 | 2.64E−03 | 1.98E−02 | 7.50 |
| 50 | 15 | 0.048 | 397 | 73 | 563 | 2982 | 2.24E−03 | 1.27E−02 | 5.64 |
| 51 | 12 | 0.1 | 352 | 63 | 573 | 2982 | 2.47E−03 | 1.33E−02 | 5.40 |
| 52 | 12 | 0.05 | 348 | 29 | NA | 2982 | 2.24E−03 | 1.15E−02 | 5.12 |
| 53 | 12 | 0.101 | 299 | NA | 403 | 2982 | 2.24E−03 | 1.99E−02 | 8.85 |
| 54 | 18 | 0.098 | 277 | NA | 309 | 2982 | 2.24E−03 | 2.87E−02 | 12.77 |

Runs 53 and 54 had two inlets and outlets so that the overall heat transfer coefficient through the annular cooling chamber 700 is necessarily higher than in the other runs. In these two test runs the coolant temperature was not measured however the values reported are extracted from run 51 at corresponding locations in the flow. The throat material temperature was not measured in run 52 and the value reported is extrapolated from run 51 at station with similar gas temperature. The chamber temperature presented is based on the baseline design condition described above. The actual run condition chamber pressure for runs 48 through 51 was used to correct the baseline data for the hot side heat transfer coefficient. Baseline data (200 psia) is used for runs 52, 53 and 54.

Based on the results of the analysis presented above, the ratio of hot to cold heat transfer coefficients varies between 5 and 7.5 for all runs. One run excepted was for run 48, where coolant mass flow rate was abnormally low, and the saturated liquid-vapor coolant mixture appeared to have completely evaporated in the annular cooling chamber and potentially decomposed at one point. The ratio in the steady part of test run 48 was 2. These results match or exceed the ratio of 5 described.

In the runs where two inlets and outlets were used (runs 53 and 54), the ratio is even higher, 9 and 13, respectively, suggesting that the saturated liquid-vapor coolant mixture, on average, is closer to the optimum point.

These results thus validate the cooling method proposed here as a feasible means of maintaining rocket motor throat integrity, from a heat transfer point of view, beyond the minimum heat transfer coefficient ratio defined above, even in the limit of single inlet and outlet coolant paths. With two (or more) inlets and two (or more) outlets, the method is demonstrably several times better than required. The two outlet runs (Run 53 and 54) were carried out using the same nozzle, and thus showed that the cooling method can be suitable means of guaranteeing reusability in nozzle design.

Figure 15:
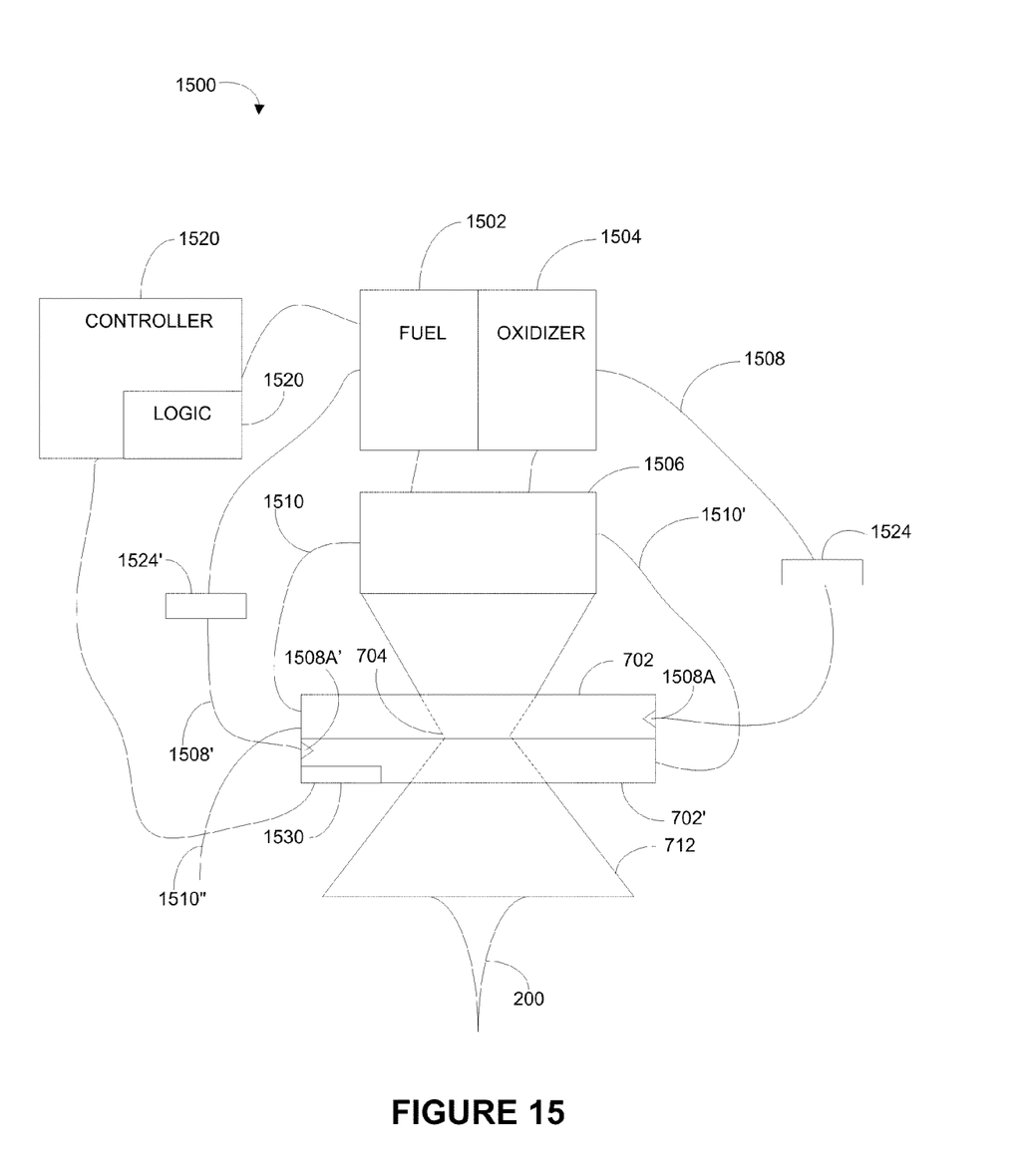
FIG. 15 is a schematic diagram of the cooling system, in accordance with an embodiment of the present invention.

FIG. 15 is a schematic diagram of the cooling system 1500, in accordance with an embodiment of the present invention. The system 1500 includes a fuel source 1502 and an oxidizer source 1504 that are coupled to a combustion chamber 1506. At least one of the oxidizer source 1504 and the fuel source 1502 are coupled to respective cooling chambers 702, 702'. Flowrate and pressure of the respective oxidizer and fuel are controlled by respective in-line flow and pressure control devices 1524, 1524'. The oxidizer source 1504 and the fuel source 1502 can be coupled to respective cooling chambers 702, 702' through respective coolant injection nozzles 1508A, 1508A'. The oxidizer and/or the fuel are injected into the cooling chambers as a liquid that flashes to a saturated liquid-vapor coolant mixture at the lower pressure of the cooling chamber.

The system 1500 also includes a controller 1520 and logic 1522 for controlling the flowrate, residence time, pressure, temperature of the coolant in the respective cooling chambers 702, 702'. The controller 1520 is coupled to the cooling chambers 702, 702' and sensor and control devices 1530. The sensor and control devices 1530 can include flowrate monitoring and control devices, pressure monitoring and release devices, temperature sensors.

The outlets 1510, 1510' of the respective cooling chambers 702, 702' can be coupled to the combustion chamber. Alternatively or additionally, one or more of the outlets 1510, 1510' can be coupled to a vent 1510". All or a portion of the respective coolants can be released from one or both of the cooling chambers 702, 702' to the combustion chamber 1506 and/or the vent 1510".

While the respective cooling chamber 702, 702' are shown in a annular configuration around portions of the rocket motor, it should be understood that the cooling chambers can be in other forms such as coil a form or a localized cooling location that does not surround a portion of the rocket motor but is thermally bonded to the cooled portion of the rocket motor.

While the respective cooling chamber 702, 702' are shown with a single inlet and a single outlet, it should be understood that more than one inlet and/or more than one outlet could be included. The numbers of inlets and the numbers of outlets in one of the cooling chambers 702, 702' can be different. The orientation of the inlets and outlets are not necessarily geometrically opposites in the cooling chamber.

The rocket motor combustion chamber 1506 tapers to a throat 704. The cooling chambers 702, 702' are shown formed around the throat 704. However it should be understood that the cooling chambers 702, 702' could be thermally bonded to any portion of the rocket motor that may be desired to be cooled. The throat 704 of the rocket motor is coupled to an exhaust nozzle 712. The exhaust nozzle 712 can also include an aerospike 200. One or more of the cooling chambers 702, 702' can be included in or thermally bonded to at least a portion of the aerospike 200.

Figure 16:
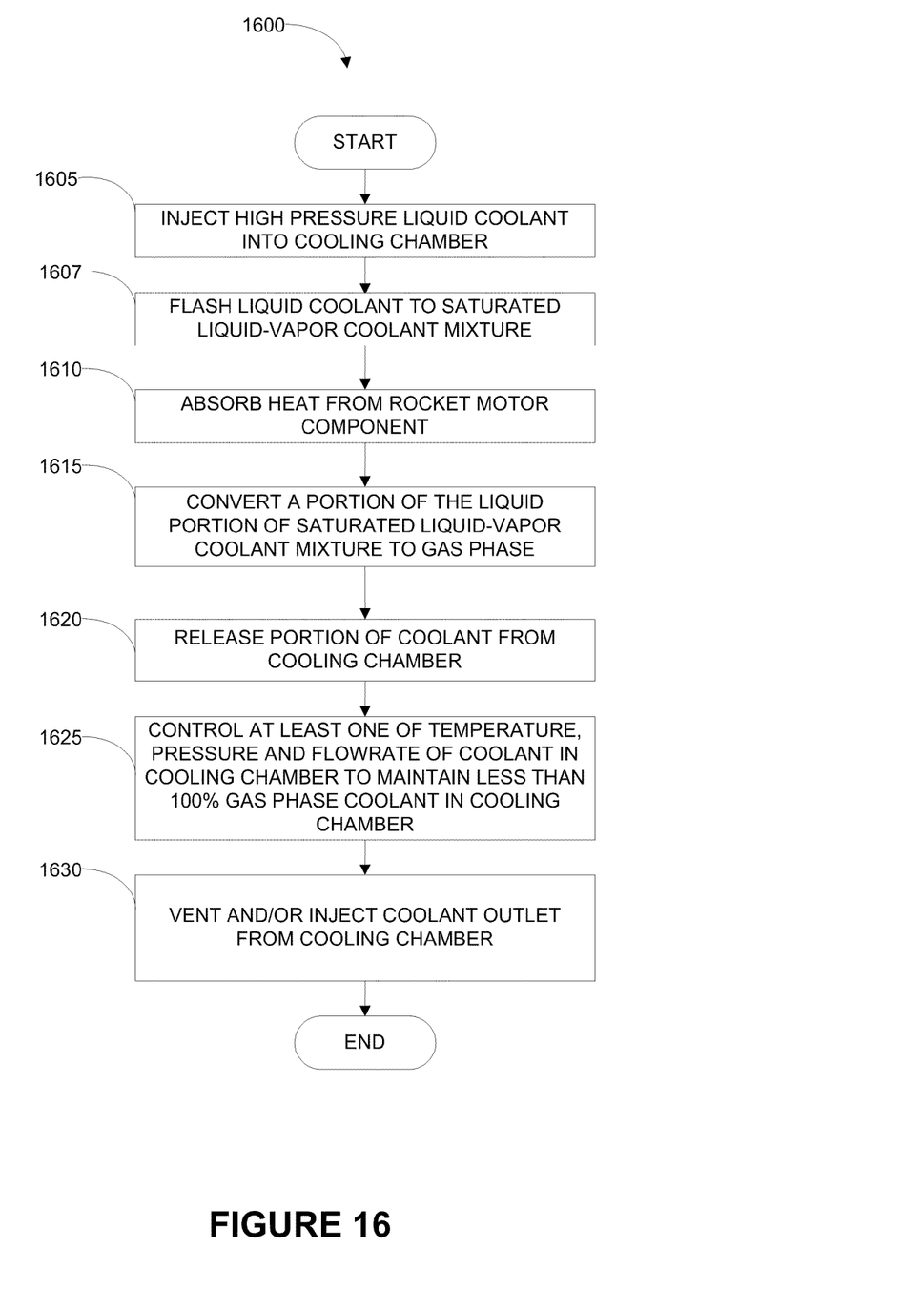
FIG. 16 is a flowchart diagram that illustrates the method operations performed in cooling a rocket motor, in accordance with one embodiment of the present invention.

FIG. 16 is a flowchart diagram that illustrates the method operations 1600 performed in cooling a rocket motor, in accordance with one embodiment of the present invention. The operations illustrated herein are by way of example, as it should be understood that some operations may have suboperations and in other instances, certain operations described herein may not be included in the illustrated operations. With this in mind, the method and operations 1600 will now be described.

In an operation 1605, a high pressure liquid coolant is injected through an injector nozzle into the cooling chamber having a lower pressure than the high pressure coolant. In an operation 1607, the liquid coolant flashes into a saturated liquid-vapor coolant mixture at equilibrium at the temperature and pressure of the cooling chamber. The saturated liquid-vapor coolant mixture absorbs the heat from the rocket motor component in operation 1610.

In an operation 1615, a liquid portion of the saturated liquid-vapor coolant mixture is converted to gas phase. In an operation 1620, a portion of the coolant is released from the cooling chamber.

In an operation 1625, a temperature of rocket motor component being cooled and the flow rate of fuel and oxidizer into the combustion chamber of the rocket motor are monitored. At least one of the temperature, pressure and flowrate of the coolant into and within and out of the cooling chamber are monitored and controlled by the controller to maintain the coolant in the cooling chamber to less than 100% gas phase. In this manner the amount of cooling can be dynamically adjusted to compensate for the desire thrust and heat generated by the rocket motor and thus prevent the cooled rocket motor component from over heating.

The coolant released from the cooling chamber is injected into the combustion chamber and/or vented away from the rocket motor in an operation 1630. The method operations continue as the rocket motor requires cooling and then the method operations can end.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code and/or logic on a computer readable medium. The computer readable medium is any data storage device that can store data which can thereafter be read by a computer system. Examples of the computer readable medium include hard drives, network attached storage (NAS), logic circuits, read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in the above figures are not required to be performed in the order illustrated, and that all the processing represented by the operations may not be necessary to practice the invention. Further, the processes described in any of the above figures can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of cooling a rocket motor component comprising:
    injecting a high pressure liquid coolant through an injector nozzle into a cooling chamber, the cooling chamber having a pressure lower than the high pressure liquid coolant;
    flashing the liquid coolant into a saturated liquid-vapor coolant mixture in the cooling chamber, wherein the saturated liquid-vapor coolant mixture is at equilibrium at the lower pressure of the cooling chamber, wherein the cooling chamber is thermally coupled to a rocket motor component to be cooled;
    absorbing heat from the rocket motor component to be cooled;
    converting a portion of the liquid portion of the saturated liquid-vapor coolant mixture into gas phase, the converted portion being less than 100% of the coolant contained within the cooling chamber;
    releasing a portion of the coolant from the cooling chamber into a combustion chamber of the rocket motor; and
    maintaining the coolant in the cooling chamber at less than 100% gas phase of the coolant.

2. The method of claim 1, wherein converting a portion of the liquid portion of the saturated liquid-vapor coolant mixture into gas phase includes absorbing the heat from the rocket motor component to be cooled sufficient to equal the heat of vaporization of the converted liquid portion of the saturated liquid-vapor coolant mixture.

3. The method of claim 1, wherein the coolant includes a liquid fuel for the rocket motor.

4. The method of claim 3, wherein the coolant includes a liquid oxidizer for the rocket motor and the liquid oxidizer is delivered to a first cooling chamber and the liquid fuel is delivered to a second cooling chamber.

5. The method of claim 1, wherein the coolant is a liquid oxidizer for the rocket motor.

6. The method of claim 5, wherein the liquid oxidizer is nitrous oxide ($N_2O$).

7. The method of claim 1, wherein the rocket motor is a hybrid rocket motor with a solid fuel.

8. The method of claim 1, wherein the coolant does not include a coking fluid for forming a coking internal film coolant.

9. The method of claim 1, wherein maintaining the coolant in the cooling chamber at less than 100% gas phase of the coolant includes dynamically adjusting at least one of a flowrate, a residence time, a temperature and/or a pressure of the coolant through the cooling chamber.

10. The method of claim 1, wherein the rocket motor component to be cooled includes at least one of a portion of an aerospike nozzle and a portion of a rocket motor combustion chamber.

11. The method of claim 1, wherein the coolant is a liquid oxidizer for the rocket motor and 100% of the oxidizer is injected into the cooling chamber before being injected into from the cooling chamber and into a combustion chamber of the rocket motor.

12. A method of cooling a rocket motor component comprising:
    injecting a high pressure liquid coolant through an injector nozzle into a cooling chamber, the cooling chamber having a pressure lower than the high pressure liquid coolant;
    flashing the liquid coolant into a saturated liquid-vapor coolant mixture in the cooling chamber, wherein the saturated liquid-vapor coolant mixture is at equilibrium at the lower pressure of the cooling chamber, wherein the cooling chamber is thermally coupled to a portion of an aerospike nozzle and wherein the rocket motor is a hybrid rocket motor having a solid fuel;
    absorbing heat from the portion of the aerospike nozzle;
    converting a portion of the liquid portion of the saturated liquid-vapor coolant mixture into gas phase, the converted portion being less than 100% of the coolant contained within the cooling chamber;
    releasing a portion of the coolant from the cooling chamber into a combustion chamber of the rocket motor; and
    maintaining the coolant in the cooling chamber at less than 100% gas phase of the coolant.

13. The method of claim 12, wherein the coolant is a liquid oxidizer for the rocket motor and 100% of the oxidizer is injected into the cooling chamber before being injected into from the cooling chamber and into a combustion chamber of the rocket motor.

14. The method of claim 12, wherein the cooling chamber is thermally coupled to a portion of a rocket motor combustion chamber.

15. The method of claim 12, wherein the coolant is a liquid oxidizer for the rocket motor.

16. The method of claim 12, wherein the coolant does not include a coking fluid for forming a coking internal film coolant.

17. A method of cooling a rocket motor component comprising:
    injecting a high pressure liquid oxidizer through an injector nozzle into a cooling chamber, the cooling chamber having a pressure lower than the high pressure liquid oxidizer;
    flashing the liquid oxidizer into a saturated liquid-vapor oxidizer mixture in the cooling chamber, wherein the saturated liquid-vapor oxidizer mixture is at equilibrium at the lower pressure of the cooling chamber, wherein the cooling chamber is thermally coupled to a portion of an aerospike nozzle;
    absorbing heat from the portion of the aerospike nozzle;
    converting a portion of the liquid portion of the saturated liquid-vapor oxidizer mixture into gas phase, the converted portion being less than 100% of the oxidizer contained within the cooling chamber;
    injecting the oxidizer from the cooling chamber into a rocket motor combustion chamber; and
    maintaining the oxidizer in the cooling chamber at less than 100% gas phase of the oxidizer.

18. The method of claim 17, further comprising:
    injecting a high pressure liquid fuel through a second injector nozzle into a second cooling chamber, the second cooling chamber having a pressure lower than the high pressure liquid fuel;
    flashing the liquid fuel into a saturated liquid-vapor fuel mixture in the second cooling chamber, wherein the saturated liquid-vapor fuel mixture is at equilibrium at the lower pressure of the second cooling chamber, wherein the second cooling chamber is thermally coupled to a portion of the rocket motor;
    absorbing heat from the portion of the rocket motor; and
    injecting the fuel from the second cooling chamber into a rocket motor combustion chamber.

19. The method of claim 17, wherein the oxidizer does not include a coking fluid for forming a coking internal film coolant.

20. The method of claim 18, wherein the fuel does not include a coking fluid for forming a coking internal film coolant.

* * * * *